July 22, 1969     H. S. HOLLNAGEL ET AL     3,456,767
HYDRAULICALLY RELEASED, SPRING SET, FAIL SAFE DISK BRAKE
Filed Sept. 26, 1967
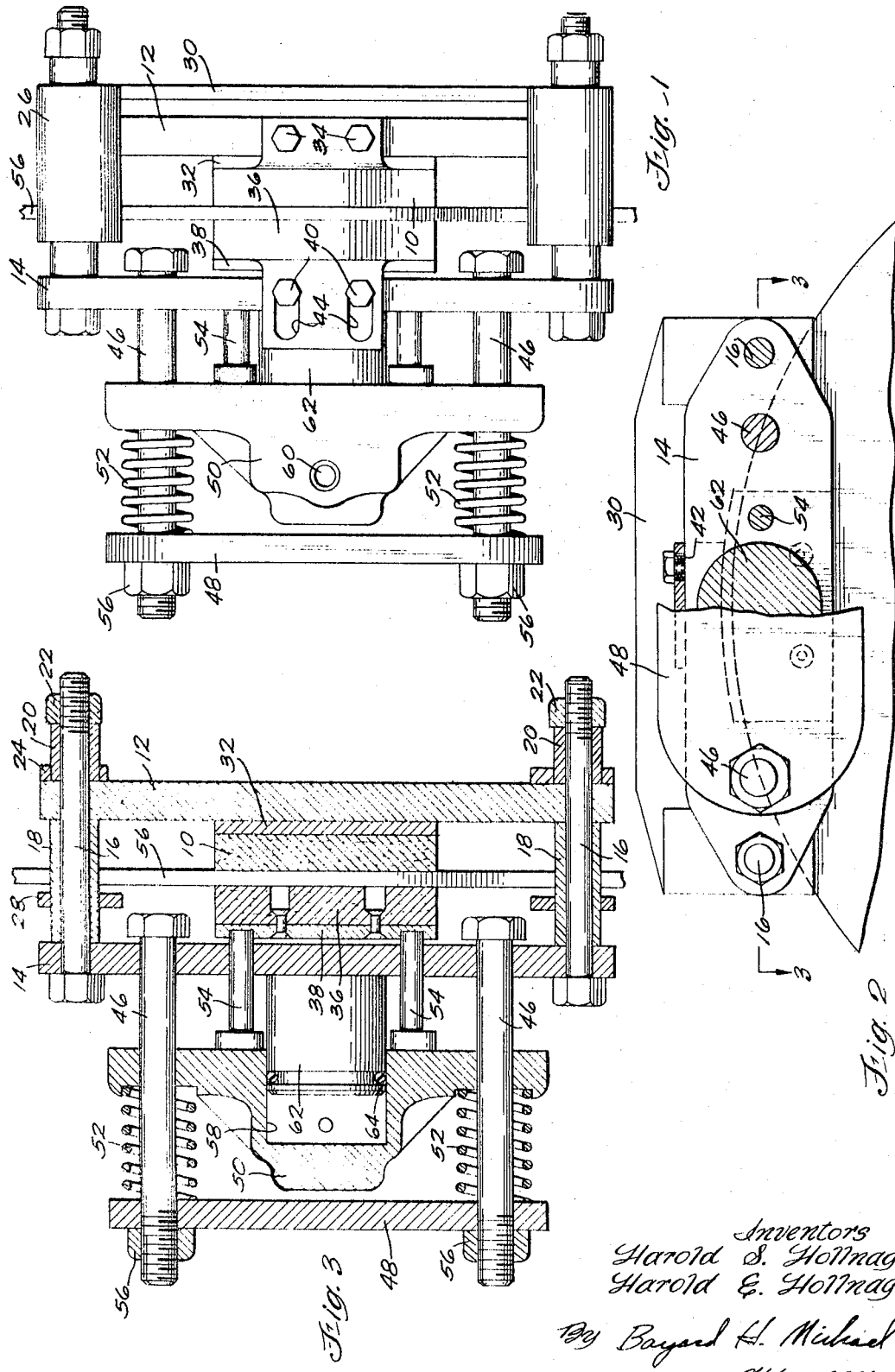
Inventors
Harold S. Hollnagel
Harold E. Hollnagel
By Bayard H. Michael
Attorney United States Patent Office 3,456,767
Patented July 22, 1969

3,456,767
HYDRAULICALLY RELEASED, SPRING SET, FAIL SAFE DISK BRAKE
Harold S. Hollnagel, Milwaukee, and Harold E. Hollnagel, Mequon, Wis., assignors, by mesne assignments, to Kelsey-Hayes Company, Romulus, Mich., a corporation of Delaware
Filed Sept. 26, 1967, Ser. No. 670,712
Int. Cl. F16d 65/24, 55/20
U.S. Cl. 188—170                    6 Claims

ABSTRACT OF THE DISCLOSURE

The springs compressed between the backing plate and the cylinder plate drive the cylinder plate against the pins which force the brake pad carrier, supported by the intermediate plate, towards the fixed brake pad, carried by the fixed plate, to apply the disk brake. Hydraulic pressure applied in the cylinder forces the piston against the intermediate plate and the cylinder casting away from the intermediate plate against the spring force. This relieves the force applied through the pins and releases the brake. Failure of hydraulic pressure allows the springs to reapply the brake. This is a fail safe design to apply the brakes on loss of hydraulic pressure.

BACKGROUND OF INVENTION

There are various environments requiring a fail safe brake wherein the brakes are applied upon loss of power. The brake shown here is operated to release the brakes when there is hydraulic pressure available but when the hydraulic pressure fails the brakes are applied with a spring force. This type of brake is known in the prior art but has heretofore taken a rather complex configuration.

SUMMARY OF INVENTION

The present construction is notable for its simplicity of design and fabrication and results in a spring set, pressure released brake at relatively low cost making possible use of such brakes in environments heretofore foreclosed for cost reasons. The great percentage of parts in the present design are readily fabricated from stampings or simple purchased parts of the shelf-type variety.

DESCRIPTION OF DRAWINGS

FIG. 1 is a plane view of the brake assembly with the brake applied.

FIG. 2 is an end view of FIG. 1 taken as indicated by line 2—2 in FIG. 1.

FIG. 3 is a horizontal section taken as indicated by line 3—3 in FIG. 2.

DESCRIPTION OF PREFERRED EMBODIMENT

The fixed brake pad 10 is carried on plate 12 which is fixed relative to the intermediate plate 14 by mounting the plates on bolts 16 with the bushing 18 therebetween serving as a spacer. To the right (FIG. 3) of plate 12 there is an additional bushing 20 mounted between the nut 22 and plate 12 to also serve as a spacer. The depending legs 24, 28 of bracket 26 are respectively mounted on bushings 20, 18 to let the brackets 26 float on the bushing to allow the brake assembly to adjust to the disk 56. The two brackets 26 are interconnected by a web 30 which serves as the mounting support.

It will be noted that the brake pad 10 is carried on a steel support 32 which is secured to the plate 12 by bolts 34. The movable brake pad 36 is carried on a steel support 38 which is connected to plate 14 for sliding movement. Thus the bolts 40 are drawn up tight against spacers 42 passing through the slots 44. The spacers 42 serve to prevent the bolts from restricting sliding movement of the bracket 38 and pad 36 within the range allowed by the slots 44.

It will be noted that plate 14 is additionally provided with bolts 46 which carry spring retainer plate 48. The cylinder casting 50 is slidably mounted on bolts 46 and springs 52 are compressed between the retainer plate 48 and the casting 50 to urge the retainer plate to the right and the force thus applied by the springs acts through the casting 50 onto the headed pins 54 which project through plate 14 to act directly on the slidable bracket 38 carrying the brake pad 36. Thus, the force of springs 52 is transmitted through the casting and the push pins to drive the floating brake pad 36 towards the right (FIGS. 1 and 3) to clamp the disk 56 between the floating and fixed brake pads 36 and 10. It will be appreciated that the force in springs 52 acting against plate 48 and, hence, against nuts 56 will, in effect, fix the plate 48 with respect to plate 14.

It will be noted the casting 50 has a cylinder 58 formed therein in a central position. Suitable inlets 60 for hydraulic fluid are provided in the space between the cylinder head and piston 62 which is sealed in the cylinder by means of O-ring 64. When hydraulic pressure is applied in the cylinder it will force the piston 62 towards the right and, of course, the piston will promptly bottom on the fixed plate 14. Continued application of hydraulic pressure must now force the cylinder casting 50 to the left against the force of springs 52. This relieves the spring force acting on the push pins 54 and, therefore, allows the floating brake pad carrier 38 to move to the left to release the brakes. The limit of the travel of cylinder 50 is determined by the spacing between the casting and the retainer plate 48.

It will be apparent that so long as sufficient hydraulic pressure is maintained in the cylinder to overcome the springs 52 the brake will be released. If the hydraulic pressure fails for any reason the springs 52 force the casting 50 to the right against pins 54 to force the floating brake pad 36 towards fixed brake pad 10 to apply the brake.

The design permits a wide range of operating parameters to be selected. Of course, the strength of springs 52 determines the applied force but it will be appreciated that any number of springs can be set up to operate between the plate 48 and casting 50. The magnitude of the hydraulic pressure necessary to overcome the brakes can be adjusted by adjusting the size of the cylinder.

A further feature to note is the open construction permitting maximum ventilation and heat dissipation.

We claim:

1. A spring set, pressure released disk brake com prising:
    fixed parallel plates in spaced relationship,
    a brake pad fixed on the first plate facing the second plate,
    a floating brake pad mounted on the second plate for movement towards the first plate,
    a member mounted for guided movement towards and from the second plate on the side of the second plate opposite the side facing the first plate,
    means conecting the member and the floating brake pad to move the floating brake pad towards the fixed brake pad as the member moves towards the second plate,
    spring means acting on the member to urge it towards the second plate, and
    hydraulic means for moving the member away from the second plate.

2. A brake according to claim 1 in which the spring means are compressed between the member and a third plate.

3. A brake according to claim 2 in which the member includes a cylinder,
a piston in the cylinder disposed between the member and the second plate so hydraulic pressure forces the piston against the second plate and the member against the spring means.

4. A brake according to claim 3 in which the connecting means comprise push pins passing through the second plate.

5. A brake according to claim 4 in which travel of the member against the force of the spring means under influence of hydraulic pressure is limited by contact of the member with the third plate.

6. A brake according to claim 5 in which the first and second plates are bolted together with a spacer therebetween and the second and third plates are bolted together with the spring means urging the third plate away from the second plate to the limit of travel imposed by the bolts.

References Cited

UNITED STATES PATENTS

| | | | |
|---|---|---|---|
| 2,809,308 | 10/1957 | Turner | 188—170 X |
| 3,082,647 | 3/1963 | Banker | 188—170 X |
| 3,297,115 | 1/1967 | Walöen et al. | 188—170 |

DUANE A. REGER, Primary Examiner

U.S. Cl. X.R.

188—73